United States Patent [19]
Brouwer

[11] Patent Number: 4,735,134
[45] Date of Patent: Apr. 5, 1988

[54] APPARATUS FOR STORING PRODUCE

[75] Inventor: John Brouwer, Cookstown, Canada

[73] Assignee: Shur-Stor Systems Inc., Tillsonburg, Canada

[21] Appl. No.: 921,128

[22] Filed: Oct. 21, 1986

Related U.S. Application Data

[62] Division of Ser. No. 786,062, Oct. 10, 1985.

[51] Int. Cl.$^4$ ............................................. A23B 7/00
[52] U.S. Cl. ........................................ 99/476; 99/516
[58] Field of Search ................ 99/467, 468, 473–476, 99/516, 534, 536; 426/419; 261/DIG. 46, DIG. 65

[56] References Cited

U.S. PATENT DOCUMENTS

| | | | |
|---|---|---|---|
| 2,079,304 | 5/1937 | Polderman | 426/419 |
| 3,733,060 | 5/1973 | Merritt | 261/DIG. 65 |
| 4,078,480 | 3/1978 | Luck | 99/476 |

*Primary Examiner*—Timothy F. Simone

[57] ABSTRACT

The present invention provides a system including method and apparatus for storing living plants or produce, and in particular, tuberous-type plants, such as potatoes and carrots in the dormant stage. The method comprises collecting the plants in a storage area and then creating a storage area vapor pressure, which at least substantially prevents a loss of moisture from the plants to the air in the storage area and additionally providing an exchange of air between the storage area and the supply of air outside the storage area to replenish oxygen consumed and to dispose of carbon dioxide given off by respiration of the plants.

10 Claims, 5 Drawing Sheets

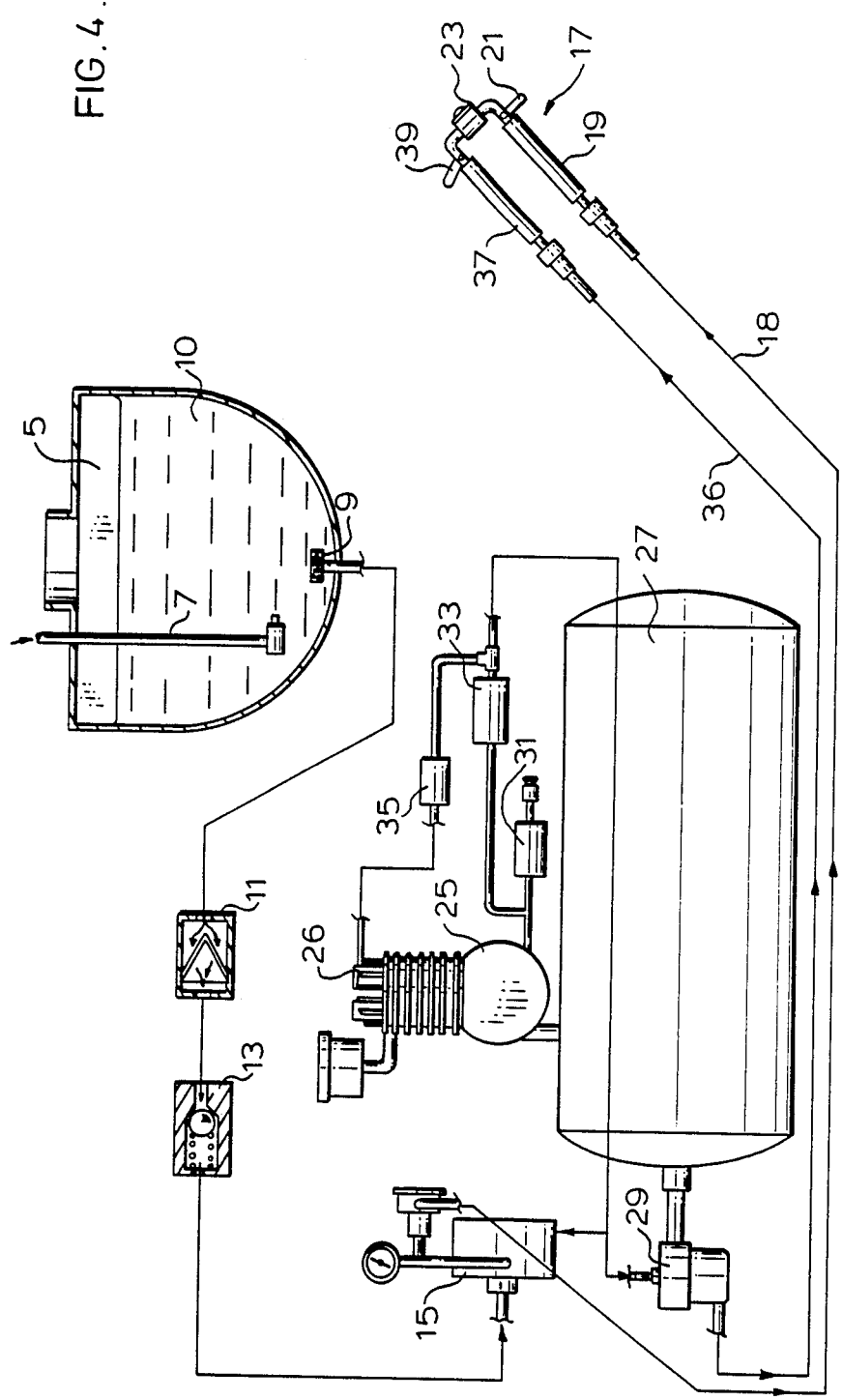

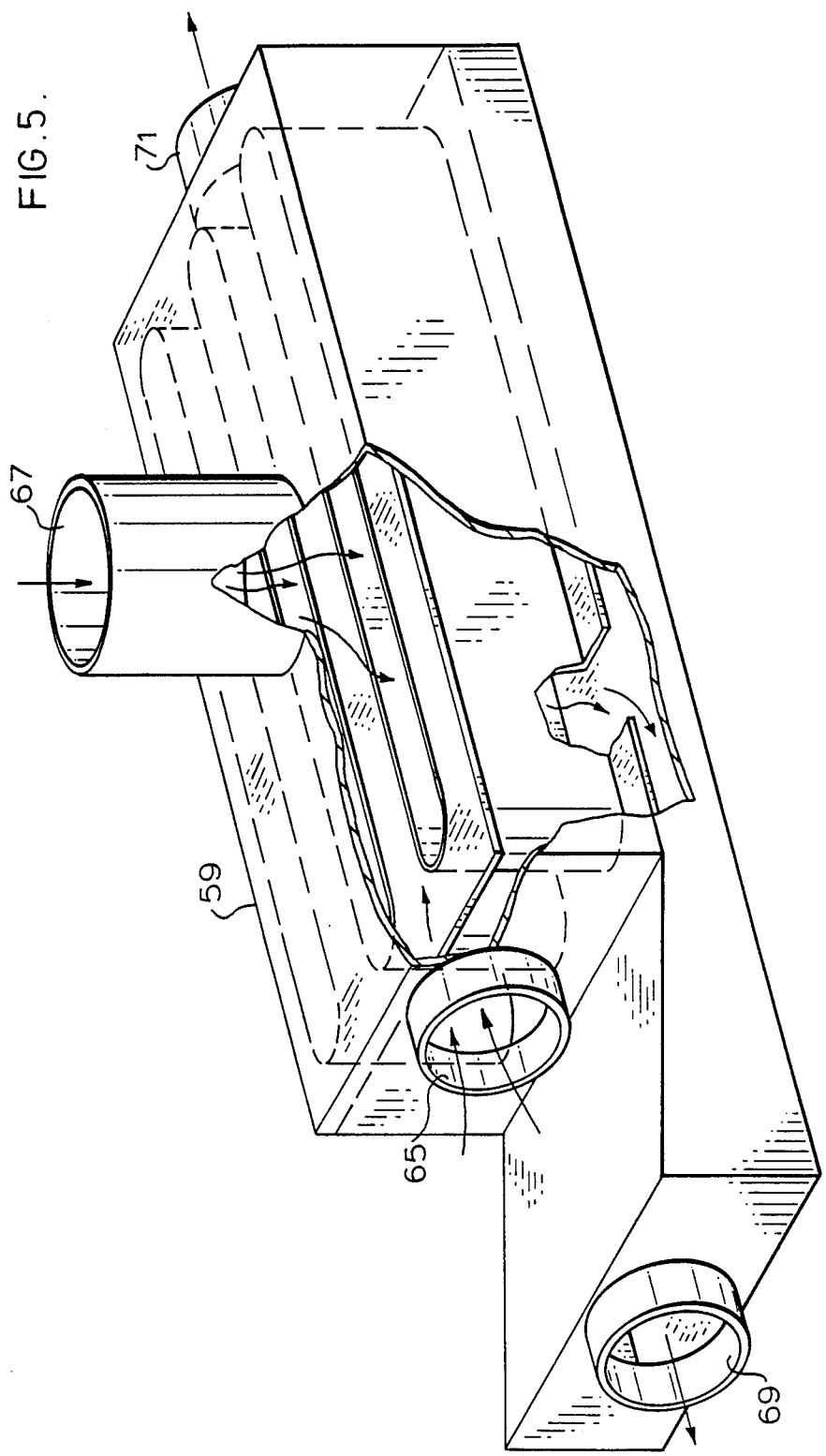

APPARATUS FOR STORING PRODUCE

This is a division of application Ser. No. 06/786,062 filed Oct. 10, 1985.

FIELD OF THE INVENTION

The present invention relates to a method and apparatus for storing living plants and in particular produce, such as potatoes, carrots and other produce items.

BACKGROUND OF THE INVENTION

It is known in the storage of produce, such as potatoes and the like, to store the produce in a storage environment having a relatively high humidity level and possibly as high as 90 to 95% humidity level, relative to the moisture level of the produce; however, this is still only a relative humidity and as such, there is a migration of moisture from the produce to the surrounding atmosphere. As a result, within a relatively short time, the produce begin to dry out, and lose weight, reducing both their appeal and value for further use and making them subject to diseases, such as fusurism dryrot, and the like.

The actual cause for the desication, or loss of moisture, is that the produce itself, although in a dormant stage does continue to respirate or breath. This respiration results in the loss of both the moisture and calories or energy from the plant, weakening the plant's resistance to diseases. In addition, the respiration of the plants, as is the case with all living form respiration, consumes oxygen and provides a build-up of carbon dioxide.

Very recently, attempts have been made to slow down the loss of moisture from stored produce. These attempts involve storing of the plants in sealed storage areas for preventing the escape of the moisture carrying surrounding air away from the plants. However, even by sealing of the storage area, there is still a continued migration of moisture from the produce to the surrounding atmosphere which again continues to be at a lower vapor pressure level than the vapor pressure of the produce. In addition, the sealing of the storage area prevents the escape of the bi-products of respiration of the plants and results in build-up of carbon dioxide levels with substantially no replenishing of the oxygen consumed during the plant respiration.

SUMMARY OF THE PRESENT INVENTION

The present invention provides a method and apparatus for storing living plants or produce, particularly designed to maximize storage life of that produce. According to the present invention, the method comprises collecting the produce in a storage area and then providing a vapor pressure within the storage area for at least substantially preventing a loss of moisture from the produce. In addition, the method of the present invention includes providing an exchange of air between the storage area and a supply of air outside of the storage area to replenish oxygen consumed and to dispose of carbon dioxide given off by respiration of the produce.

According to one particularly effective technique of providing vapor pressure levels, actually exceeding vapor pressure level of the produce, an air/water mixture is delivered as an aerosol mist into the storage area. This mist, which effectively saturates the storage area environment, is of a fineness to remain in air suspension, essentially free of condensation, and thereby substantially avoids wetting of the plants, while allowing a migration of moisture from the water laden air to the produce. The aerosol mist comprising the air/water mixture further provides a source of oxygen for plant respiration. The disposition or expelling of respiration build-up can then be achieved by opening the storage area directly to outside air sources, or in certain climate conditions, through an air exchanger, having heat exchange capabilities.

BRIEF DISCUSSION OF THE DRAWINGS

The above, as well as other advantages and features of the present invention will be described in greater detail according to the preferred embodiments of the present invention in which:

FIG. 4 shows a flowchart of the operation of the aerosol mist generating apparatus of FIG. 3;

FIG. 5 is a perspective view partially cut away of an air exchanger used according to a preferred feature of the present invention.

DETAILED DESCRIPTION OF THE PREFERRED EMBODIMENTS OF THE PRESENT INVENTION

Figure 1:
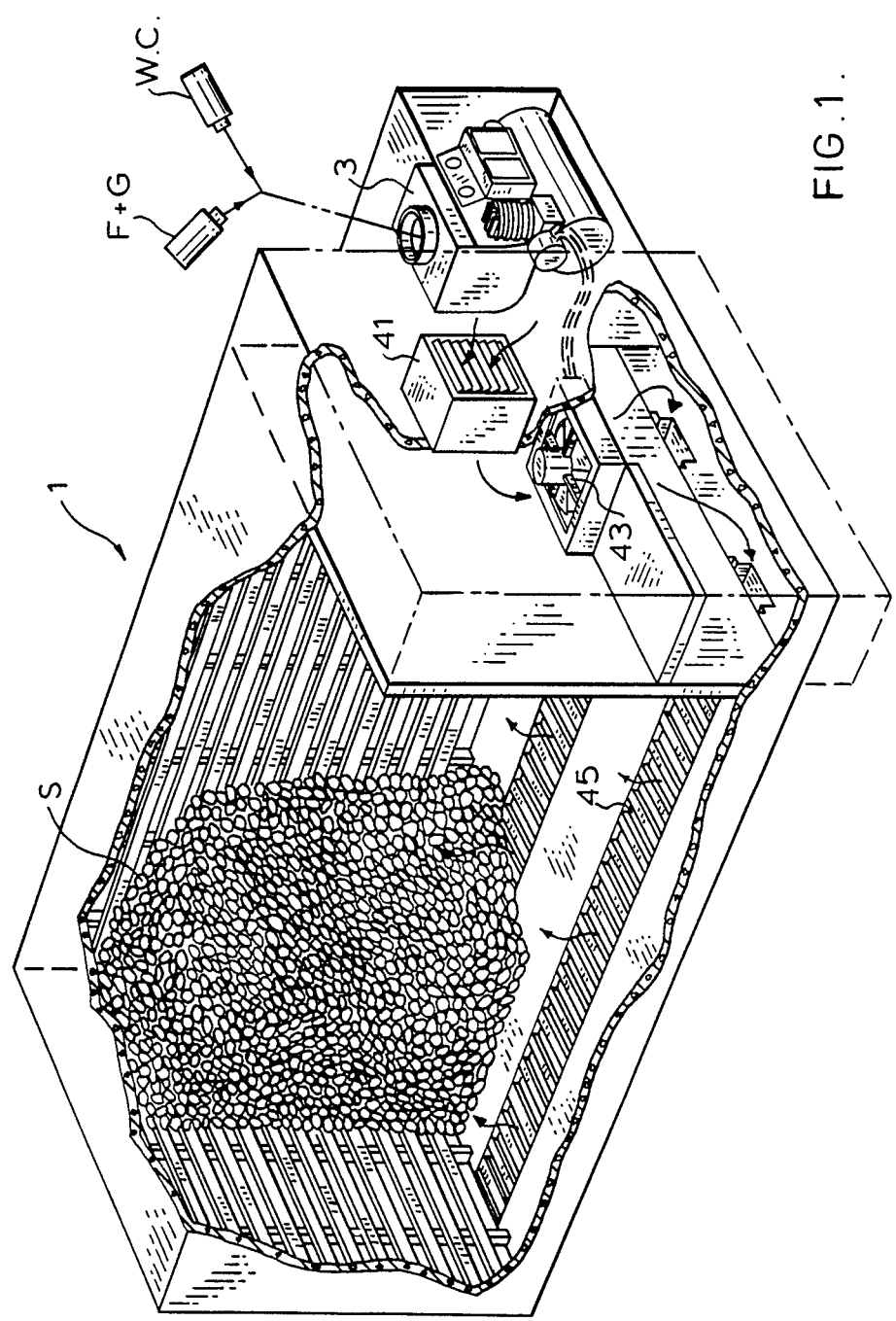
FIG. 1 is a perspective view looking down on a produce storage area, showing the storage of potatoes, according to a preferred embodiment of the present invention.

FIG. 1 shows a storage area, generally indicated at 1, containing a stock of stored produce, or in this case, potatoes, shown as S. For best storage results it is important that the storage area be substantially fully stocked and that it be further energy efficient and well insulated. In terms of size, the storage area is likely to be in the form of a barn-like structure.

The potatoes, or other plants which are stored in the storage area, although dormant, are in fact, live, and respirate within the storage area. Without providing conditions to be described below, such respiration results in a loss of water and calories from the plants which further results in associated stress factors and which makes them subject to various types of fungus, dry rot and other diseases. The present invention substantially eliminates this problem by providing optimum moisture and oxygen atmosphere conditions in the storage area, simulating natural environmental conditions.

Before going into further detail regarding the actual storage area itself, it should be noted that for potato storage in particular, there are three different potato categories including seed potatoes which are stored at about 37 degrees fahrenheit, table potatoes, stored at about 40 to 45 degrees fahrenheit and processing potatoes, i.e., potatoes used in the making of potato chips, french fries, etc. which are stored at about 45 to 50 degrees fahrenheit. It is important that such processing potatoes be high in starch and low in sugar content. However, if the potatoes are allowed to dehydrate, or are deprived of oxygen and exposed to high carbon dioxide levels, certain enzymes within the potatoes responsible for converting the sugar to starch, become very active as a result of these stress factors, causing unacceptably high sugar levels, which in turn result in a darkish appearance to the processed potato. The actual handling of the potato, before it reaches the storage area will initiate enzyme activity and it is therefore very important that these stress factors be prevented within the storage area.

The present invention includes what may be referred to as a vapor-pressure generator, specifically designed to provide a vapor pressure level within the storage area, capable of exceeding the vapor pressure level of the stored potatoes or other plants in the storage area. In the FIG. 1 arrangement this vapor pressure generator is indicated at 3 and shown in more detail in FIGS. 3 and 4 of the drawings. The purpose of generator 3 is to introduce an aerosol-type mist into the storage area, such that the storage area is actually saturated to provide a humidity level surrounding the stored potatoes which actually exceeds the vapor pressure of the potatoes Accordingly, and in contrast to prior art techniques, the potatoes do not give off moisture to, but rather take moisture from the surrounding atmosphere for maximizing storage life of the potatoes.

Figure 3:
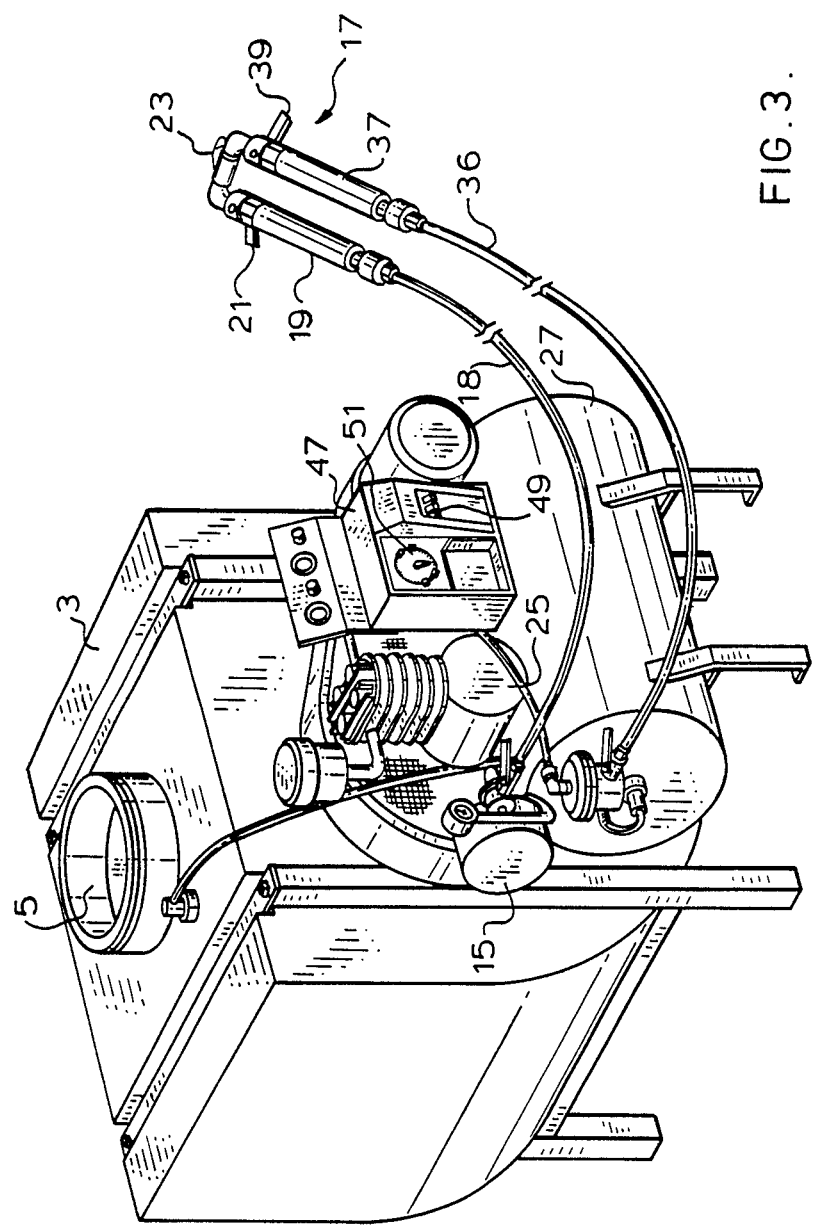
FIG. 3 is a detailed perspective view of an aerosol mist generating apparatus, according to a preferred embodiment of the present invention.

The vapor pressure generator as best shown in FIGS. 3 and 4 includes a water supply tank 5 and a pressurized air storage tank 27. The water supply and the air supply tanks feed an aerosol mist apparatus, generally indicated at 17 by feed lines 18 and 36, respectively. Aerosol mist apparatus 17 includes a nozzle 23, through which the air/water mixture is introduced in an extremely fine mist form into the storage area. In fact, this mist is so fine that it remains substantially suspended in the air within the storage area, substantially free of any condensation on the potatoes which might otherwise cause undue wetting and possible molding of the potatoes. The air/water mixture is fed through the respective lines by a pumping arrangement to be described below in greater detail at a feed rate of about 4 to 15 CFM, and the mixture, as soon as it emerges from the aerosol nozzle, substantially evaporates into the air.

Returning again to FIGS. 1 and 2, it will be seen that the aerosol mist apparatus is located in advance of a high speed fan 43, which carries the mist downwardly and along the bottom of the storage area, where the mist then percolates up through the stack of stored produce through vents 45, positioned in the floor of the storage area. Accordingly, the mist carries upwardly and around the produce in the stack to substantially surround the produce with moisture from the moisture-laden air. It is to be remembered that this air is not measured in terms of relative humidity, but rather is saturated with moisture, and has a vapor pressure greater than the vapor pressure of the produce itself.

The fineness of the mist must, as stated above, be to the extent that it is maintained in air suspension within the storage area. One of the key features to provide the required mist fineness, or atomization of the air/water mixture from the aerosol apparatus is as shown in FIG. 1, the introduction of water conditioners WC, to the water in supply tank 5. These water conditioners, which may comprise a PH reducer for balancing PH level of the water, or in effect providing a softened water, and an adjuvant, which reduces surface tension of the water, and enhances breaking down of the water into extremely fine droplets, which emerge as an atomized mist, from the aerosol nozzle.

At this point it should be noted that the air used in the mist mixture is brought in from outside of the storage area and therefore not only provides a source of air pressure in forming the mist, but additionally introduces fresh oxygen to the storage area. This, in itself, provides a replacement for some of the oxygen consumed by the respiration of the plants.

By providing required water and oxygen levels in the air within the storage area, the produce remains extremely healthy and resistant to disease infection. However, it is still desirable, at relatively infrequent intervals to add fungicides and germicides indicated at F+G as shown in FIG. 1, to the water supply. The fungicides, germicides, and the water conditioners are thoroughly intermixed in the water by means of an agitator 7, shown in FIG. 4, to provide a mixed solution 10, which is drawn off from the bottom of the water supply tank through outlet 9.

Although the germicides tend to remain in solution with the water, the fungicides tend to settle out and accordingly, the speed of the water is set, as determined by the feed rate, to maintain the fungicide in solution with the water. It has been found that by setting the water supply line at one-quarter inch diameter, the water will flow through the line at a speed that will not allow the settling out of the fungicide, so that it is effectively carried by the mist.

Conventionally, fungicides are applied directly onto the produce as it is conveyed into the storage area. This requires a substantial amount of fungicide, which reaches only to the portion of the produce exposed directly to the fungicide. In contrast, with the application of the present invention, much less fungicide is required and that which is applied, percolates up through the pile of potatoes with the mist, substantially surrounding the potatoes. Furthermore, because both the fungicide and the germicide are applied in an airborne manner, they tend to scour and clean the interior surfaces of the storage area of any airborne bacteria and fungal spores. However, it is still to be remembered that requirement of the fungicides and germicides is reduced, since, in accordance with the present invention, optimum moisture and oxygen conditions are provided, which in themselves, substantially reduce the likelihood of disease damage to the potatoes for the physiological reasons given above.

A further important aspect of the present invention is the controlling of the mist so as to prevent excessive moisture build-ups in the air and condensation onto the produce. This can be determined visually if, and when, heavy fogging appears in the storage area. Such control over the misting is provided by operating the aerosol apparatus in an on/off, rather than a continuous manner. However, it is further important that the pressure from the aerosol apparatus be at a constant level, while in the on cycle and a particularly good arrangement for achieving such constant pressure is shown in FIGS. 3 and 4 of the drawings.

The overall vapor pressure, or mist generator, in addition to the components described above, includes a filter 11 and a one-way valve 13, from the water supply tank, operated by means of a diaphragm-type pump 15, through to aerosol mist apparatus 17. The supply of air source includes, in addition to storage tank 27, a compressor 25, with a pressure switch 31, a solenoid valve 33, and a pilot unloader mechanism 35, up to the valve head 26, of the compressor. The actual supply of air from the storage tank to the mist apparatus is provided through an air supply pressure regulating valve 29, incorporating a relief valve.

The air to the aerosol apparatus is provided from pressurized tank 27, which has sufficiently high capacity to maintain a constant supply of air pressur to the aerosol apparatus as it is needed, while compressor 25 ensures the air pressure within the storage tank. As the air is drawn off through the air supply pressure regulating valve 29, the compressor operates to maintain the supply of air within the tank. However, the compressor itself is set up to freewheel, or to operate free of load, as soon as adequate pressure is established within the storage tank and this eliminates constant on and off cycling, which is otherwise hard on the compressor. This particular feature is provided by an air line which feeds a supply of air when the storage tank is at high pressure, up through the solenoid valve, to the pilot unloader mechanism to remove the load at the valve head on the compressor, although the compressor continues to run, even though the storage tank has already reached capacity pressure.

Diaphragm pump 15 on the water side of the supply is also operated from the air supply and continues to operate to provide a supply of water through the water supply line 18, as long as the air pressure is operating on the diaphragm switch within the pump. As soon as the air supply is turned off, then the diaphragm pump will, in turn, cut off the supply of water from tank 5 to the aerosol nozzle. However, again it is important to remember that although the operation of the aerosol apparatus is not continuous, while it is in operation, the pressure is constant, resulting in the required mist consistency.

The actual on/off operation for the aerosol apparatus is controlled through a control panel 47, shown in FIG. 3. The control panel includes on/off switches 49, for manual control, as well as a timer 51, for automatic control of the aerosol mist. This timer is again set so as to provide saturation without excessively wetting the storage area.

The discussion thus far has dealth generally with the introduction of the mist including its own supply of oxygen to the storage area. However, it is further critical that the bi-products of the produce respiration and, in particular, carbon dioxide, be disposed of from within the storage area, and further that additional supplies of oxygen be introduced to the storage area environment.

Figure 2:
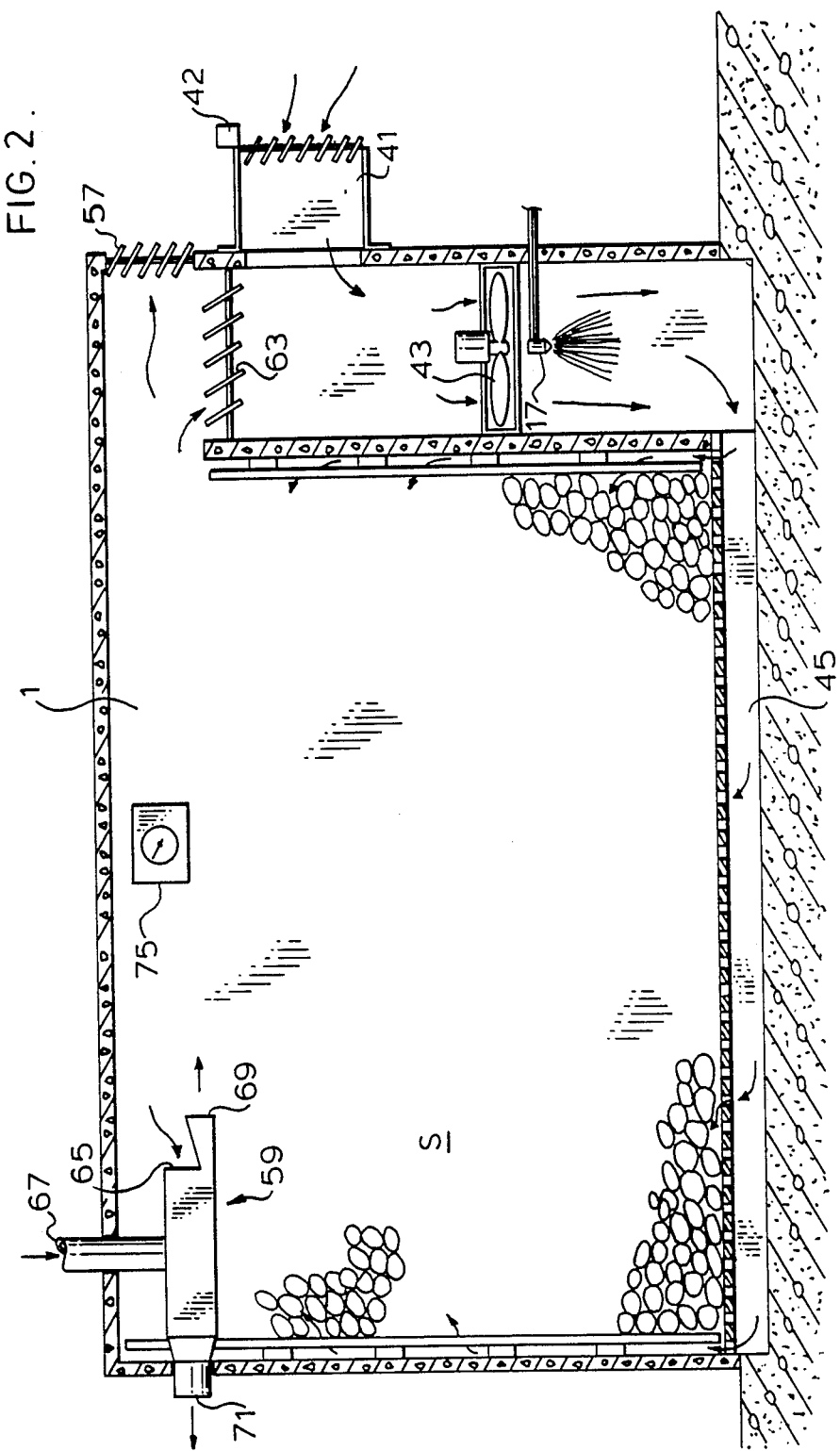
FIG. 2 is a sectional view from the side of the storage area, shown in FIG. 1.

FIGS. 1 and 2 show a set up effective for achieving this result, while FIG. 5 shows in detail, an air exchanger for use in the intake of fresh air and the expelling of carbon dioxide laden air.

Provided on the outer wall of the storage area is an air intake 41, which provides a supply of fresh outside air drawn in by fan 43, and directed to the plants through the bottom vent 45. This provides a pressure build-up within the storage area which causes automatic opening of an exhaust louver 57, for expelling carbon dioxide laden air from the storage area.

Air intake 41 is operational primarily during relatively warm weather periods when the air can be brought directly from the outside into the storage area. During these periods there is a substantial amount of ventilation of the stored produce, which in turn results in a substantial amount of evaporation within the storage area. To accommodate for this, water supply head 19 of the aerosol mist apparatus is provided with an adjustable control 21, as shown in FIG. 3, for adjusting liquid volume through the aerosol mist nozzle which, in relatively warm weather, and high evaporation periods, is set at a high volume level, but still at a constant pressure, relative to colder periods when the ventilation to the storage area is substantially reduced, which in turn reduces evaporation requiring a much lighter aerosol mist.

The air supply head 37, is also provided with an adjustable control 39. However, this control is used primarily to provide the initial air supply setting which, once established, is held substantially constant, and therefore not adjusted by control 39. It should be noted at this time that when the mist generator is not in operation with a full air supply tank, the air in the tank can be drawn off through pressure switch 31, and put to any other desired use, thereby further increasing the versatility of the system.

Returning once again to the outside air supply, intake 41 is set up to include thermostatic controls 42, which sense outside temperatures and which will only allow the intake to operate in the relatively warm weather periods and which will prevent its operation during certain weather periods. During these weather periods, when intake 41 is closed, air exchanger 59 takes over to provide for the supplying of fresh oxygen laden air to the storage area.

As mentioned above, when the storage area is used for storing potatoes, and depending upon the intended use of the potatoes, the storage area is maintained at a temperature of anywhere from about 37 to 50 degrees fahrenheit. As will be appreciated, some assistance will be required by means of cooling and heating units in hotter and cooler periods, respectively. However, the evaporation of the mist, by taking up heat energy from the air, does provide a very effective assistance to the cooling of the storage area in the warm weather periods. In the cold weather periods air exchanger 59, which has heat exchange properties, is very effective in helping to maintain the desired temperature.

A further set of internal louvers 63, is also provided for assisting and maintaining appropriate temperature levels within the storage areas. These louvers are connected directly to the louvers of the air intake 41, and are referred to as proportional louvers, inasmuch as they are controlled to operate in the opposite direction to the louvers of the air intake. Therefore, when the louvers of the air intake are fully opened, proportional louvers 63 are fully closed, for introduction of outside air through the air intake and expelling of the CO2 laden air through static pressure operated exhaust louvers 57, without any recycling within the storage area. However, when the air intake is fully closed, louvers 63 will be in fully opened position in which case the air within the storage area is recycled or recirculated by means of fan 43, as shown in FIG. 2, so as to maintain heat energy within the storage area. It is to be appreciated that the description above relates to the full opening and closing of the respective louvers and that each set of louvers could be set in a partially opened position to provide for some air intake with some recycling for tempering the temperature of the incoming air.

Air exchanger 59, is used primarily during cold weather periods with the details of the air exchanger being best shown in FIG. 5. An exhaust port 65 at the inside of the storage area is provided for taking the carbon dioxide laden air from the storage area, which eventually exists through the air exchanger to an exterior port 71. A fresh air intake 67, brings fresh air in from outside of the storage area, which runs through the exchanger in heat transfer with the outgoing air through an interior baffle arrangement, as shown in FIG. 5. After picking up the heat energy from the outgoing air, the incoming air is fed through port 69, to the interior of the storage.

As will be appreciated from the description immediately above, the air exchanger with heat exchange capacity, substantially increases efficiency of the set-up, in that during the colder weather periods, when heating is required within the storage area, the heat that is generated is not all lost with the outgoing air, but rather is used to heat the incoming air for maintaining proper temperature levels within the storage area. The air exchanger is particularly useful with the proportional louvers 63 as it provides a supply of outside air in combination with recycling of the interior air when intake 41 is closed.

It should further be noted that the air exchanger is also useable in warm weather periods when the outside air is at a temperature above the desired temperature level within the storage area. In this situation the air exchanger actually operates in a cooling mode, where the air which is brought in from the outside, through the air exchanger, is through heat exchanger cooled by the outgoing air from the storage area.

In a preferred arrangement, the set-up is provided with a carbon dioxide monitor 75, which constantly measures carbon dioxide levels within the storage area. As earlier described, one purpose of the present invention is to provide a storage atmosphere, which closely resembles natural outdoor growing environment for the potatoes. In such an environment, the ambient air will contain about 300 parts per million carbon dioxide. Carbon dioxide levels above the ambient are still acceptable up to about 1,500 preferably not exceeding 2,000 parts per million, where carbon dioxide sensor 75, is set to automatially control venting of the storage area with either the warm weather venting including a combination of intake 41 and exhaust louvers, or cold weather venting, through air exchanger 59.

As a further feature of the present invention, the venting itself is an effective manner of disease dilution within the storage area, through the dispersing of airborne disease causing organisms from within the storage area.

As will be understood from the above, the operation of the method and apparatus of the present invention, provides a number of extremely beneficial results over conventional storage techniques. Significantly, the produce stored within the storage area is maintained at optimum moisture and oxygen levels, which extends the life of the produce, and which substantially enhances its ability to fight off fungi and bacterial diseases, without requiring large amounts of expensive fungicides and germicides. All of this results in much healthier produce, having minimal, if any, shrinkage which in turn, results in a much more marketable and valuable product.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. Apparatus for storing produce comprising a storage area in which the produce is collected, an aerosol mist generator for creating a vapor pressure level within the storage area to at least substantially prevent a loss of moisture from the produce and air exchange means to provide an exchange of air between air in said storage area and a supply of air outside of said storage area to replenish oxygen consumed and to dispose of carbon dioxide given off by the produce, said aerosol mist generator comprising pressurized water and air supply lines meeting with one another to provide a water atomized by high air pressure mixture and a mist nozzle through which such mixture is then forced as an aerosol mist by the high air pressure.

2. Apparatus as claimed in claim 1 including valving means in each of said water and air supply lines for controlling flow therethrough.

3. Apparatus as claimed in claim 2, in which said aerosol mist generator is settable from an on to an off condition and includes means for maintaining constantly high air pressure during the off condition to provide substantially instantaneous atomization of said mist when returned to the on condition.

4. Apparatus as claimed in claim 3, including timing means for on/off control of said aerosol mist generator.

5. Apparatus as claimed in claim 3, including pumping means for building up an air pressure supply providing the constantly high air pressure and means for relieving load on said pumping means allowing same to operate free of load once the supply of air pressure has been built up.

6. Apparatus, as claimed in claim 2, wherein the aerosol mist is introduced at about 4 to 15 CFM and wherein said water supply line has about a one-quarter inch diameter.

7. Apparatus as claimed in claim 1, including an air intake with a thermostatically controlled louver mechanism for introducing fresh outside air to said storage area and further including an exhaust arrangement automatically operated by static pressure within said storage area for expelling carbon dioxide laden air from within said storage area.

8. Apparatus, as claimed in claim 7, including propotional louvers controlled by said air intake to open and close in reverse with the louver mechanism of said air intake and to enable recycling of the air within said storage area for controlling temperature thereof.

9. Apparatus, as claimed in claim 1, including an air exchanger with heat exchange properties for expelling outgoing carbon dioxide laden air from within said storage area and for introducing fresh outside air which is in heat exchange with the outgoing air through said air exchanger.

10. Apparatus, as claimed in claims 8 or 9, including a carbon dioxide monitor for automatically controlling the intake of fresh air and the expelling of carbon dioxide laden air at a prespecified carbon dioxide level within said storage area.

* * * * *